United States Patent

Nishida et al.

[11] Patent Number: 6,119,343
[45] Date of Patent: Sep. 19, 2000

[54] PROCESS FOR MANUFACTURING A PRESSURE ROLL

[75] Inventors: Hirotaka Nishida, Minoo; Yasuo Nakata, Settsu, both of Japan

[73] Assignee: Taisei Kako Co., Ltd., Osaka, Japan

[21] Appl. No.: 09/260,059

[22] Filed: Mar. 2, 1999

Related U.S. Application Data

[62] Division of application No. 08/572,471, Dec. 14, 1995.

[51] Int. Cl.$^7$ ...................................................... B23P 15/00
[52] U.S. Cl. ........................ 29/895.2; 29/895.2; 29/895.3
[58] Field of Search ............................. 29/895.21, 895.3, 29/428, 525

[56] References Cited

U.S. PATENT DOCUMENTS

| | | | |
|---|---|---|---|
| 1,608,206 | 11/1926 | Freedlander | 29/895.21 |
| 3,046,637 | 7/1962 | Kusters et al. . | |
| 3,090,076 | 5/1963 | Corbett . | |
| 3,098,284 | 7/1963 | Hornbostel . | |
| 3,460,221 | 8/1969 | Korsch . | |
| 3,535,760 | 10/1970 | James . | |
| 3,663,027 | 5/1972 | Klipping . | |
| 3,742,714 | 7/1973 | Thomas . | |
| 3,756,760 | 9/1973 | McBride . | |
| 3,846,901 | 11/1974 | Lovett . | |
| 4,113,825 | 9/1978 | Hill et al. . | |
| 4,327,467 | 5/1982 | Quaint . | |
| 4,378,622 | 4/1983 | Pinkston et al. | 29/895.2 |
| 4,425,695 | 1/1984 | Tokuno . | |
| 4,483,053 | 11/1984 | Hamisch, Jr. | 29/895.21 |
| 4,519,757 | 5/1985 | Wittkopf et al. . | |
| 4,580,395 | 4/1986 | Castoldi . | |
| 4,605,366 | 8/1986 | Lehmann et al. . | |
| 5,091,027 | 2/1992 | Watanabe . | |
| 5,240,666 | 8/1993 | Schnyder et al. . | |
| 5,484,370 | 1/1996 | Jenke et al. . | |
| 5,896,662 | 4/1999 | Matsuzawa et al. | 29/895.21 |

FOREIGN PATENT DOCUMENTS

| | | |
|---|---|---|
| 165750 | 12/1985 | European Pat. Off. . |
| 386 316 | 9/1990 | European Pat. Off. . |
| 2241824 | 3/1974 | Germany . |
| 2515932 | 6/1976 | Germany . |
| 4118549 | 12/1994 | Germany . |
| 475437 | 9/1975 | U.S.S.R. . |
| 795689 | 5/1958 | United Kingdom . |
| 1421828 | 1/1976 | United Kingdom . |

OTHER PUBLICATIONS

Patent Abstracts of Japan, Saito Iwao; *Manufacture of Rubber Lining Steel Pipe*; Jul. 30, 1980; 1 page.
Patent Abstracts of Japan, Murayama Akira et al.; *Method of Manufacturing Elastic Roller*; Feb. 12, 1980; 1 page.

*Primary Examiner*—Irene Cuda
*Attorney, Agent, or Firm*—Wenderoth, Lind & Ponack, L.L.P.

[57] ABSTRACT

A method of manufacturing a pressure roll including a cylindrical core member having a center shaft, an intermediate layer surrounding the core member and formed from a flexible material, and an outermost layer surrounding the intermediate layer and formed from a high-thermal conductivity material. The method includes forming a plurality of axially extending notches in a cylindrical member to form tongues, radially bending the tongues of the cylindrical member so as to enlarge one end of the cylindrical member, and inserting a core member into the enlarged end of the cylindrical member.

10 Claims, 4 Drawing Sheets

PROCESS FOR MANUFACTURING A PRESSURE ROLL

This application is a divisional application of U.S. Pat. application No. 08/572,471, filed on Dec. 14, 1995.

FIELD OF THE INVENTION

The present invention relates to a pressure roll having good cooling characteristics, a molding apparatus of a plastic sheet equipped with the pressure roll and a process for manufacturing the pressure roll. More particularly, the invention relates to a pressure roll having an intermediate layer formed from a flexible material and an outermost layer formed from a high-thermal conductivity material, capable of pressing a plastic sheet by the surface contact with the plastic sheet and showing high heat dissipation, to a molding apparatus equipped with the pressure roll as its essential mechanical element and capable of producing an extremely thin plastic sheet, and to a simple process for manufacturing the pressure roll.

BACKGROUND OF THE INVENTION

Typical examples of conventional practical methods for extrusion molding plastic sheets include an air knife method, a rubber roll touch method and a three-roll method.

However, if the three-roll method out of these methods is used, it is difficult to extrusion mold a plastic sheet into an extremely thin sheet having a thickness of not more than about 0.4 mm. As for the three methods, further description is omitted herein because these methods are only techniques relevant to the present invention and are not worthy of the prior art techniques from the viewpoint of patent.

In an apparatus wherein a plastic sheet extruded from a T-die is pressed by means of a pressure roll and a cooling roll facing each other to reduce the thickness of the plastic sheet, the pressure applied to the plastic sheet by the pressure roll must be increased to make the thickness of the resulting plastic sheet lower. However, the pressure roll and the cooling roll, each having a circular section, are brought into linear contact with the plastic sheet. Hence, if the pressure applied to the plastic sheet by the pressure roll is too high, various troubles such as stay of the molten resin on the upstream side take place. In the conventional apparatuses, therefore, the pressure applied to the plastic sheet was not able to be increased to such a degree to form an extremely thin plastic sheet. Further, the roll brought into linear contact with the plastic sheet in the softened or molten state cannot rapidly cool the plastic sheet sufficiently, and hence the resulting plastic sheet does not have desired characteristics and physical properties.

Figure 2A:
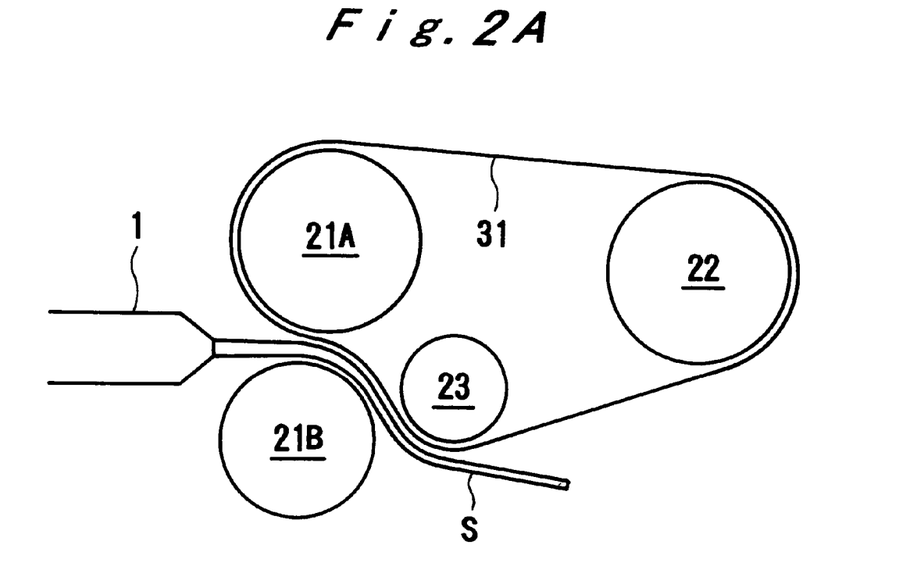
FIG. 2A and FIG. 2B are each a schematic view of an apparatus for producing an extremely thin extruded sheet in the prior art.
Figure 2B:
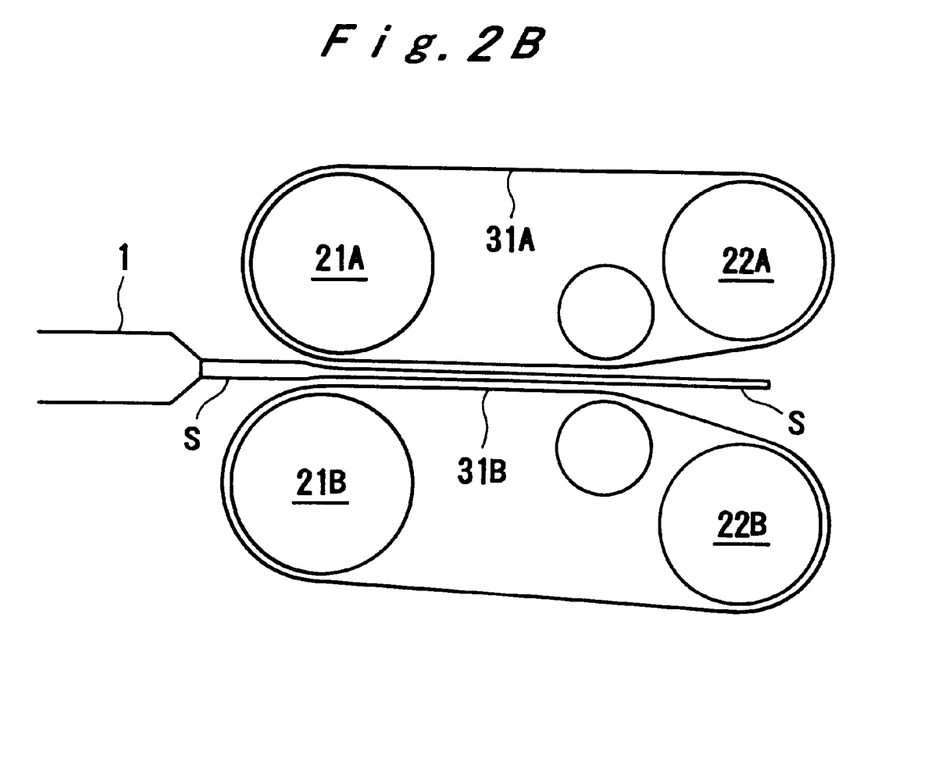

As apparatuses to solve these problems, those using a metallic belt schematically shown in FIG. 2A and FIG. 2B have been proposed. The apparatus shown in FIG. 2A includes a pressure roll 21A and a cooling roll 21B which face each other interposing therebetween a plastic sheet S extruded from a T-die 1, and further includes a corrosion-resistant (stainless) steel thin endless belt 31 wound around the pressure roll 21A, a support roll 22 and a press roll 23. The molten plastic sheet S extruded from the T-die 1 is brought into surface contact with the metallic belt 31 between the pressure roll 21A and the press roll 23 and with the (main) cooling roll 21B, and the sheet S is cooled.

The apparatus shown in FIG. 2B further includes a metallic endless belt 31B on the side of the main cooling roll 21B in addition to the metallic endless belt 31A provided on the side of the pressure roll 21A. That is, the apparatus of FIG. 2B includes a pressure roll 21A and a cooling roll 21B which face each other interposing therebetween a plastic sheet S extruded from a T-die 1, and further includes an endless belt 31 wound around the pressure roll 21A and a turning roll 22A, and an endless belt 31B wound around the cooling roll 21B and a turning roll 22B.

However, the apparatus shown in FIG. 2A necessarily becomes large-sized, and the apparatus shown in 2B becomes much more large-sized as compared with the apparatus of FIG. 2A. That is, in the apparatus of FIG. 2A, the metallic endless belt 31 is made to have an extremely small thickness (0.8 to 1.2 mm), but this belt cannot be bent in a large curvature because of stiffness of the metal used and the structure thereof, so that the diameters of the two rolls 21A and 22 must be made large. As a result, it becomes necessary to use large-diameter rolls 21A and 22 (and 21B according to circumstances) each having a diameter of not less than about 800 mm.

The apparatus of FIG. 2B has two lines of the metallic endless belts as described above, and therefore the size of this apparatus becomes much larger as compared with the apparatus having a single line of the metallic endless belt.

The endless belt used in such apparatuses is formed by joining both ends of a metallic belt, and the joint should be made so as to have no difference in level. Moreover, the joint should withstand flexures of very many times. For producing such a belt, extremely high technique is required, and therefore the production cost becomes high. Incidentally, most of the metallic endless belts favorably used for the molding apparatuses at present are imports.

Accordingly, the apparatuses using the metallic endless belts are associated with such problems that the large-sized apparatuses lower the degree of freedom in the choice of installation place, the installation cost is increased, and use of the metallic belt increases the production cost.

OBJECT OF THE INVENTION

The present invention is intended to solve such problems associated with the prior art as mentioned above, and it is an object of the invention to provide a pressure roll which is small, inexpensive and able to effectively perform adjustment of the thickness of a molten plastic sheet and cooling of the plastic sheet without using a large-sized apparatus including a metallic belt, a large-diameter pressure roll and a large-diameter support roll.

It is another object of the invention to provide a molding apparatus using the above-mentioned pressure roll, which is small-sized owing to the pressure roll, has a high degree of freedom in the choice of installation place, is low in the installation cost and the production cost, and can be easily operated.

It is a further object of the invention to provide a process for easily manufacturing the pressure roll.

SUMMARY OF THE INVENTION

The pressure roll according to the present invention comprises a cylindrical core member having a center shaft, an intermediate layer surrounding the core member and formed from a flexible material and an outermost layer surrounding the intermediate layer and formed from a high-thermal conductivity material having a thermal conductivity of not less than 0.03 cal/cm.sec.° C.

In the pressure roll of the invention, the high-thermal conductivity material for forming the outermost layer is a metal, and preferably a metal selected from aluminum, aluminum alloy, copper, copper alloy, iron and iron alloy.

When the outermost layer is formed from a metal, the ratio of its mean thickness to an outer diameter of the pressure roll (thickness of outermost layer/outer diameter of pressure roll) is in the range of 0.1 to 1.5% preferably 0.25 to 1.2%, and the mean thickness of the outermost layer is not less than 0.6 mm.

In the pressure roll of the invention, further, the intermediate layer has at least one cavity extending inside over almost the whole length of the intermediate layer in the generant direction, into which a pressure transmission medium is injected so that the pressure by the pressure roll to the plastic sheet can be changed by the injection pressure of the medium. When two or more of the cavities are provided in the intermediate layer, at least one condition selected from kind, amount and temperature of the pressure transmission medium injected into each cavity can be independently determined for each cavity.

The molding apparatus of a plastic sheet according to the present invention comprises a main cooling roll and a pressure roll for making a plastic sheet in the molten or softened state run between the main cooling roll and the pressure roll with pressing the plastic sheet so as to reduce the sheet thickness, and a cooling means serves to cool the surface of the pressure roll with a liquid or gaseous medium, in which the pressure roll has the above-mentioned structure.

In the molding apparatus of the invention, the liquid medium for cooling the surface of the pressure roll may be selected from water, a salt aqueous solution and an aqueous solution of a water-soluble organic compound.

The molding apparatus of the invention may further include a medium removal means for removing the liquid medium given by the cooling means from the surface of the pressure roll. The removal means for removing the liquid medium from the surface of the pressure roll can be made up of at least one means selected from a scraper rubber blade, a sponge wiper and a cold air spraying device.

The first process for manufacturing a pressure roll according to the invention comprises:

forming plural notches on the circumference of a cylindrical member at given intervals, which extend from one end of the cylindrical member and are in parallel with the generant of the cylindrical member, bending plural tongues formed among the notches in the radial direction to enlarge the inner diameter of one end of the cylindrical member, and inserting a core member into the cylindrical member from the enlarged end, said core member being surrounded with an intermediate layer formed from a flexible material and having an outer diameter larger than the inner diameter of the cylindrical member.

The second process for manufacturing a pressure roll according to the invention comprises:

surrounding a core member with an intermediate layer which is formed from a flexible material and has a cavity penetrating the intermediate layer in the width direction, inserting the core member into a cylindrical member, and injecting a fluid into the cavity at a given injection pressure to increase the thickness of the intermediate layer so as to make the intermediate layer fully contacted with the inner surface of the cylindrical member.

In the second process for manufacturing a pressure roll, when the core member is inserted into the cylindrical member, the pressure in the cavity is desirably reduced to decrease the thickness of the intermediate layer.

PREFERRED EMBODIMENT OF THE INVENTION

Preferred embodiments of the pressure roll according to the invention and the molding apparatus according to the invention provided with the pressure roll will be described in detail with reference to the attached drawings.

Figure 1A:
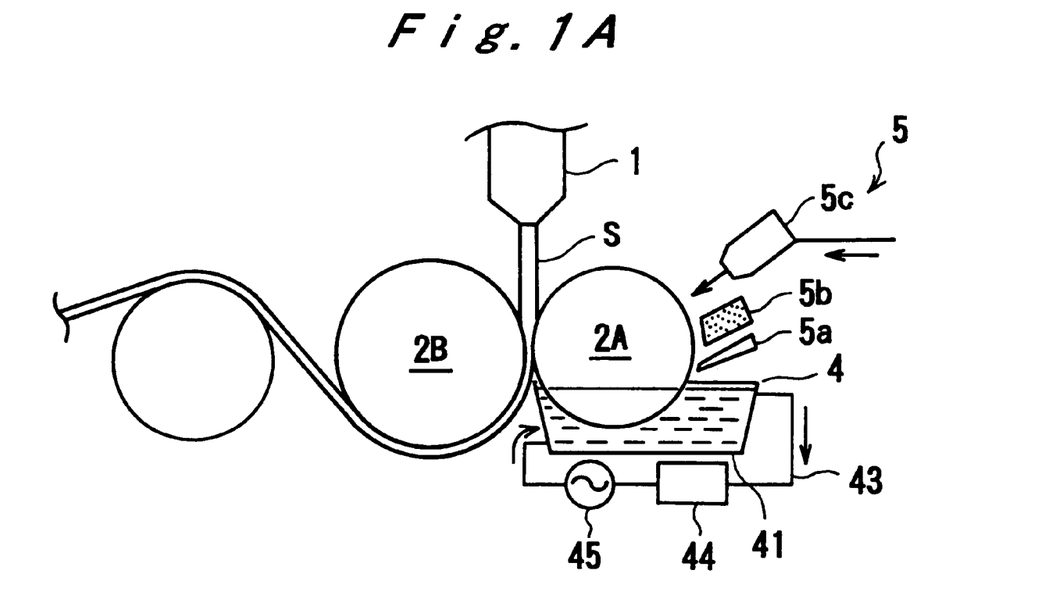
FIG. 1A is a schematic view of one preferred embodiment of a molding apparatus provided with a pressure roll according to the present invention.
Figure 1B:
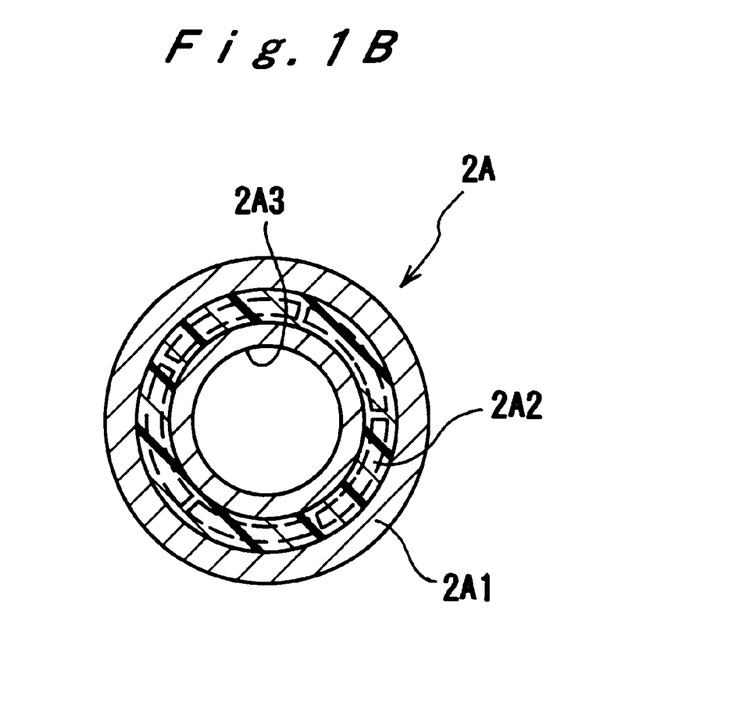
FIG. 1B is a sectional view of one preferred embodiment of a pressure roll according to the present invention.

FIG. 1A is a schematic view of one preferred embodiment of the molding apparatus provided with a pressure roll according to the invention, and FIG. 1B is a schematic sectional view of the pressure roll according to the invention.

In the molding apparatus of this embodiment, as shown in FIG. 1A, a plastic sheet S extruded from a T-die 1 equipped in an extruder is cooled by a cooling roll system 2AB and pressed in the thickness direction into a thin film having a predetermined thickness. The cooling roll system 2AB includes a pressure roll 2A and a main cooling roll 2B which face each other interposing therebetween the plastic sheet S in the molten or softened state extruded from the T-die 1. The plastic sheet S between the rolls 2A and 2B is pressed by those rolls 2A and 2B which are in surface contact with the sheet S, while the sheet S is rapidly cooled, whereby the thickness of the sheet S is decreased to a predetermined thickness. The pressure roll 2A and the main cooling roll 2B are individually described below in more detail.

As shown in FIG. 1B, the pressure roll 2A of the invention comprises a cylindrical core member 2A3 having a center shaft, a cylindrical intermediate layer 2A2 surrounding the core member 2A3 and formed from a flexible material and a cylindrical outermost layer 2A1 surrounding the intermediate layer 2A2. (see: also FIG. 3)

The pressure roll 2A can be prepared in the following manner. The core member 2A3, that has a smaller diameter than the pressure roll 2A practically used and is made of a metal such as steel, is covered with a cylindrical member made of a flexible material, e.g., a soft rubber such as a silicone rubber, to form an intermediate layer 2A2 (thickness: usually about 5 to 25 mm). Then, the surface of the intermediate layer 2A2 is covered with a cylindrical member made of a material of high thermal conductivity, e.g., metals such as corrosion-resistant steel (e.g., SUS 304), aluminum and aluminum alloy, in such a manner that they are fully contacted with each other, to form an outermost layer 2A1. The core member 2A3 may be a rotating shaft itself of the pressure roll, or may have such a structure that a rotating shaft part having a small diameter is formed at each end of a column body having a large diameter.

The outermost layer 2A1 constitutes a surface of the pressure roll 2A, that is brought into contact with the plastic sheet S. There is no specific limitation on the material of the outermost layer 2A1, except that the material has a thermal conductivity of not less than 0.03 cal/cm.sec.° C., preferably 0.035 to 0.6 cal/cm.sec.° C., and desirably has high mechanical strength. A metal is practically used as the material of the outermost layer 2A1.

The intermediate layer 2A2 made of a flexible material serves to hold the outermost layer 2A1 located on its surface with elastically deforming and deflecting the outermost layer to a desired degree. Owing to the deflection of the outermost layer 2A1, the surface of the pressure roll 2A is brought into surface contact with the molten plastic sheet, and further the molten plastic sheet is brought into surface contact with the cooling roll 2B. Therefore, even when the plastic sheet is strongly pressed, the plastic sheet is not broken, and the plastic sheet can be efficiently cooled. Moreover, the surface quality of the resulting plastic sheet S can be improved to a remarkably high level.

That the surface contact is actually made can be confirmed by the fact that, when the pressure roll 2A colored with a red dye (or pigment) is pushed to the plastic sheet S on the cooling roll 2B at a predetermined pressure in a direction vertical to the plastic sheet S, the dye is transferred onto the surface of the plastic sheet S as a red color area of "a certain width." This "width" is referred to as "deformation quantity of pressed area".

The intermediate layer 2A2 may be provided with a cavity or a passageway inside, as shown by broken lines in FIG. 1B. When such a cavity is formed and a pressure transmission fluid is injected into the cavity, the internal pressure of the cavity can be adjusted from the outside. That is, by providing a passageway within the intermediate layer, the internal pressure of the passageway can be increased or decreased by further providing in the molding apparatus a feed means (not shown) for feeding a pressure transmission fluid to the passageway and feeding the pressure transmission fluid into the passageway by the feed means at a desired pressure, and controlling the pressure for feeding the fluid. By increasing and decreasing the internal pressure, the pressing force (pressure) of the pressure roll can be finely adjusted, and moreover the deflection of the outermost layer can be also adjusted.

As the pressure transmission fluid, gases are more favorably used than liquids because the width of adjustment of the pressure is large. In general, incondensable gases such as pressurized air and pressurized nitrogen are preferred. Air is most easily available, but nitrogen is superior to air in prevention of oxidation of the flexible material.

The thickness of the outermost layer 2A1 can be varied according to the material of the layer. When the material of the outermost layer 2A1 is a metal, the ratio of a mean thickness of this layer to an outer diameter of the pressure roll 2A (thickness of outermost layer/outer diameter of pressure roll) is in the range of 0.1 to 1.5%, preferably 0.25 to 1.2%, and the mean diameter is desirably not less than 0.6 mm. The lower limit of the thickness is a lower limit defined by the metal film-forming technique currently used. Accordingly, if an outermost layer which has a given thermal conductivity, high durability and much smaller thickness is produced with the development of the technique in future, the lower limit of the outermost layer 2A1 might be lowered.

There is no specific limitation on the outer diameter of the pressure roll 2A, but in general, it is in the range of 250 to 700 mm, preferably 280 to 600 mm. Therefore, the pressure roll 2A is not necessarily a large-diameter roll which is commonly used with a metallic belt, e.g., a roll having an outer diameter of 800 mm. The surface of the outermost layer 2A1 is cooled by a later-described cooling means.

Among metals of high corrosion resistance, corrosion-resistant steel, aluminum, aluminum alloy, copper and copper alloy such as bronze are preferably used as the materials of the outermost layer 2A1, not only in view of mechanical strength such as flexural strength, flexural modulus, tensile strength, tensile modulus, rigidity, toughness and specific strength but also in view of mechanical processability and costs.

The pressure roll 2A of the above structure has been desirably subjected to mirror finish on the surface which is to be contacted with the plastic sheet S extruded from the T-die. The mirror finished surface has such smoothness that the surface roughness, as measured by a measuring method defined by JIS B0601, is not more than 0.5 S, preferably not more than 0.2 S, and the smoothness of this degree is idiomatically referred to "four grinding files". This extremely smooth surface serves to form a smooth surface of the plastic sheet S.

The main cooling roll 2B, that is a constituent of the molding apparatus of this embodiment, is formed from, for example, cast steel. When smoothness is required for the surface of the resulting plastic sheet, the surface of the main cooling roll 2B has been desirably subjected to mirror finishing. The mirror finished surface has such smoothness that the surface roughness, as measured by a measuring method defined by JIS B0601, is not more than 0.5 S, preferably not more than 0.2 S, and the smoothness of this degree is idiomatically referred to "four grinding files". This extremely smooth surface serves to form a smooth surface of the plastic sheet S.

It is desired that the material for forming the main cooling roll 2B is selected from materials which per se have high thermal conductivity. However, the main cooling roll lacks for heat dissipation ability in the self-cooling due to the thermal conductivity of its material. Therefore, the main cooling roll is generally compensated for lack of the cooling ability by providing inside a cavity or a passageway through which a cooling medium (refrigerant) passes, similarly to the sectional structure at the pressure roll shown in FIG. 1B. In this case, water at room temperature or warm water is generally used as the cooling medium. If much higher cooling ability is necessary, cold water, brine or liquid gas can be properly used.

In addition to the cooling roll system 2AB consisting of the pressure roll 2A and the cooling roll 2B described above, the molding apparatus of this embodiment further includes a cooling means 4 for cooling the surface of the pressure roll 2A with a cooling liquid medium and a removal means 5 for removing the cooling liquid medium from the surface of the pressure roll 2A after cooling.

The cooling means in this embodiment has a cooling liquid medium (refrigerant) reservoir 41 and a feed device for feeding the refrigerant of a given temperature to the reservoir 41. The feed device includes a discharge tube 43 for circulating the refrigerant stored in the reservoir 41, a temperature adjuster 44 for adjusting the temperature of the discharged refrigerant (e.g., cooling of the refrigerant) and a pump 45 for sending the cooled refrigerant to the reservoir 41. In the refrigerant stored in the reservoir 41, a lower part of the pressure roll 2A is immersed, whereby the surface of the pressure roll 2A is forcibly cooled with the liquid medium.

In this embodiment, the reservoir 41 and the refrigerant feed device constitute the cooling means for forcibly cooling the surface of the pressure roll 2A. However, the structure of the cooling means employable in the invention is not limited to the above-described means 4 of this embodiment, and various cooling means are applicable.

The removal means 5 for removing the liquid medium from the surface of the pressure roll 2A, i.e., surface of the outermost layer 2A1, cooled by the cooling means 4 is made up of at least a rubber scraper blade (scraper) 5a, a sponge wiper 5b formed from a flexible material and a cold air spraying device 5c (not shown), details of which will be described below.

(i) The scraper blade 5a is a member in the form of a belt one longer side of which is thinner than the other longer side and having a water drop-like section. The whole length of the blade 5a is almost equal to the length of the generant of the outermost layer 2A1, and the thinner side is lightly contacted with the surface of the outermost layer 2A1 to scrape the refrigerant. In this embodiment, however, the cooling liquid medium remaining on the surface of the outermost layer is not sufficiently removed by scraping with the blade 5a, and therefore the later-described cold air spraying device 5c is used in combination.

The material of the blade 5a is generally a rubber, specifically a hard rubber, but the blade may be formed from other material having properties equivalent to those of the hard rubber, e.g., a thermoplastic elastomer. Of various thermoplastic elastomers, practically useful is a thermoplastic elastomer composed of a composition of crystalline polyolefin and a semi-crosslinked ethylene-propylene elastomer.

(ii) The material of the sponge wiper 5b may be a natural sponge or may be a synthetic sponge that is a porous material formed from a flexible material such as rubber. This sponge wiper 5b is lightly contacted with the wet, surface of the outermost layer 2A1, whereby the surface is wiped with the wiper to remove the cooling liquid medium remaining on the surface. The sponge wiper 5b has a length almost equal to that of the generant of the outermost layer 2A1 and is brought into contact with the surface of the outermost layer 2A1. In this embodiment, however, the cooling liquid medium remaining on the surface of the outermost layer is not sufficiently removed by wiping with the sponge wiper 5b, and therefore the below-described cold air spraying device 5c is used in combination.

(iii) It is a matter of course that the cold air spraying device 5c is a device to spray cold air much enough to blow off or evaporate the refrigerant onto the surface of outermost layer 2A1 so as to remove the wet state. When the air flow is sufficiently large, the cold air spraying device is able to remove the liquid medium from the surface of the outermost layer 2A1 even if the device is used alone. In this embodiment, however, the cold air spraying is carried out after most of the liquid medium is removed from the surface of outermost layer by the above-mentioned scraper blade 5a or sponge wiper 5b. By removing the liquid medium in this manner, the energy consumption can be reduced more than in the case where the air cold spraying device 5c is used singly.

In this embodiment, the removal means for removing the liquid medium from the surface of the pressure roll 2A has the above structure, but the structure of the removal means is not limited to the removal means 5 of this embodiment, and various removal means are applicable. For example, the removal means may be made up of any one of the scraper blade 5a, sponge wiper 5b and the cold air spraying device 5c, or it may be made up of two of them, e.g., any two of the scraper blade 5a and the sponge wiper 5b and the cold air spraying device 5c. However, preferred is the structure of this embodiment because the liquid medium can be most completely removed and the energy consumption of the cold air spraying device 5c can be reduced.

The cooling roll system 2AB, the cooling means 4 and the removal means 5 of the molding apparatus of this embodiment are described hereinbefore. Next, the material of the pressure roll 2A for constituting the cooling roll system 2AB will be described in more detail.

The high-thermal conductivity materials for forming the outermost layer 2A1 of the pressure roll 2A are not limited to metals, but metals are most preferred from the viewpoint of practical use. The most practically useful metal for forming the outermost layer 2A1 is corrosion-resistant steel, alias, "stainless steel". However, metals superior in the thermal conductivity to the corrosion-resistant steel are, for example, copper; copper alloys such as phosphor bronze and bronze; aluminum; aluminum alloys such as duralumin.

Accordingly, if the outermost layer of the corrosion-resistant steel is insufficient in the thermal conductivity, it is preferred that the outermost layer 2A1 is formed from a metal of high thermal conductivity selected from the above metals and the outermost layer is used to produce the pressure roll 2A. In the selection of a metal as the material of the outermost layer, chemical properties of the metal must be sometimes taken into account as described below.

When purity of the metal does not have influence so much on the corrosion resistance and the thermal conductivity, no special attention needs to be paid to the purity of the metal in many cases. That is, it is enough for the outermost layer that the metal has purity of such degree that the attributes required for manufacturing mechanical elements (e.g., attributes defined by JIS, which the mechanical elements should have) can be satisfied.

Copper and copper alloys are readily corroded by ammonia or amines because of the nature of copper. However, they are hardly corroded by ordinary acids and are corroded only by concentrated nitric acid or concentrated sulfuric acid. On the other hand, aluminum and its alloys are hardly corroded by ammonia and amines, but they are readily corroded by acids and strong alkalis. To the contrary, they are highly corrosion-resistant to the concentrated nitric acid or the concentrated sulfuric acid.

In the resin molding processes commonly performed, the outermost layer is rarely contacted with concentrated nitric acid, concentrated sulfuric acid or concentrated alkali, but corrosive compounds such as ammonia, amines and hydrochloric acid might be contained in the resins as stabilizers or additives or used as catalysts. Or, the corrosive compounds might be derived from those stabilizers, additives or catalysts. Therefore, it is preferred to determine the material of the outermost layer 2A1 considering that the corrosive compounds due to stabilizers or additives contained in the resin or due to catalysts are brought into contact with the surface of the outermost layer in the resin molding process.

The material for forming the flexible intermediate layer 2A2 of the pressure roll 2A is a flexible material, and the flexible material can be used also as a material of the scraper blade 5. The flexible material desirably has a durometer hardness of 55 to 70 degrees, preferably 65 to 70 degrees, and is for example a rubber (particularly soft rubber) or a thermoplastic elastomer.

The rubber used for the intermediate layer 2A2 may be any one of natural rubber (NR) and synthetic rubber. Examples of the synthetic rubbers include cis-1,4- polyisoprene (IR), 1,3-polybutadiene (BR), isoprene-isobutene copolymer rubber (IIR) and butadiene-acrylonitrile copolymer rubber (NBR). They may be used singly or in combination. These rubbers are generally used as vulcanized (crosslinked) rubbers.

The thermoplastic elastomer is a material that is moldable by a molding means for thermoplastic resins but has certain degrees of elastomeric properties. Such thermoplastic elastomer is a homogeneous mixture of a thermoplastic resin and an elastomer or a mixture of a thermoplastic resin and a partially crosslinked (semi-crosslinked) elastomer. These mixtures may have a crosslinked structure in some degree between the thermoplastic resin component and the elastomer.

Examples of the thermoplastic elastomers include a composite of an ethylene resin and a partially crosslinked ethylene-propylene copolymer elastomer and a composite of a propylene resin and a partially crosslinked propylene-1-butene copolymer elastomer. Besides, there are many thermoplastic resins and elastomers. The rubbers, the thermoplastic elastomers and the elastomers are often used as oil-extended ones.

By the use of the molding apparatus of the invention described above with reference to the preferred embodiments, various resins can be molded into extremely thin sheets. Examples of the resins include thermoplastic resins, such as polycarbonate, polystyrene, polybutylene terephthalate, polyethylene terephthalate, cycloolefin copolymer and Polymethyl methacrylate. Of these, crystalline resins, particularly crystalline polyolefins (olefin resins), i.e., 1-olefin polymers or copolymers, are favorably used as the resins for forming extremely thin sheets.

Particular examples of the crystalline polyolefins (serving as base resins) include:

ethylene resins, such as crystalline ethylene homopolymer resin and crystalline copolymer resins of ethylene and at least one comonomer selected from other 1-olefins (e.g., propylene, 1-butene and 4-methyl-1-pentene);

propylene resins, such as crystalline propylene homopolymer resin and crystalline copolymer resins of propylene and at least one comonomer selected from other 1-olefins (e.g., ethylene, 1-butene and 4-methyl-1-pentene);

compositions of two or more resins selected from the above-mentioned ethylene reins or propylene resins;. and compositions of at least one resin selected from the above-mentioned ethylene resins and at least one resin selected from the above-mentioned propylene resins.

The ethylene resins or the propylene resins may be crystalline resins obtained by copolymerizing or graft polymerizing of other polar monomers than the above comonomers in such amounts that the properties of the crystalline ethylene or propylene resins are not deteriorated. The copolymerizable polar monomers are, for example, vinyl compounds such as vinyl acetate. The polar monomers which can be grafted are, for example, unsaturated carboxylic anhydrides such as maleic anhydride.

According to the pressure roll of the invention and the molding apparatus using the pressure roll described above, when the outermost layer 2A1 presses the extruded plastic sheet S onto the main cooling roll 2B, the outermost layer 2A1 is slightly deformed temporarily. As a result, a surface pressure is applied to the extruded plastic sheet S, while the sheet S is cooled. Accordingly, even if the pressure (pressing force) applied to the plastic sheet S is increased, the plastic sheet S is not broken, whereby the plastic sheet S can be effectively cooled owing to its wide cooling area, and moreover an extremely thin extruded sheet having very good surface condition can be produced. The fact that the contacts of the pressure roll 2A with the plastic sheet S is a surface contact can be confirmed by pressing the resin extruded sheet with a pressure roll colored with a red dye in a direction vertical to the plastic sheet. That is, after the plastic sheet is pressed by the pressure roll, the red dye on the pressure roll of the invention is transferred to the surface of the plastic sheet and takes a form of a belt having a certain width.

The pressure roll of the invention and the molding apparatus of the invention are described hereinbefore with reference to the preferred embodiments. Next, the process for manufacturing the pressure roll according to the invention will be described in detail.

The pressure roll of the invention comprises the core member, the intermediate layer and the outermost layer, and the intermediate layer is desired to be fully contacted the core material and with the outermost layer as uniformly as possible.

The pressure roll can be easily and simply manufactured by the following two processes.

(1) Even-numbered notches of given length, which extend from one end of a cylindrical member for forming an outermost layer toward the other end and are in parallel with the axis, are formed. The plural tongues formed among the notches are slightly bent outward to enlarge the inner diameter of one end of the cylindrical member in such a manner that the tips of the tongues form an enveloping circle having a diameter a little larger than the outer diameter of the cylindrical member. Then, a core member surrounded with a flexible intermediate layer is gradually inserted into the cylindrical member from the enlarged end, to manufacture a pressure roll in which the intermediate layer is surrounded with the outermost layer and they are fully contacted with each other.

(2) Within a flexible intermediate layer which surrounds a core member, a cavity extending over almost the whole length of the intermediate layer in the generant direction is formed. The core member surrounded with the intermediate layer is inserted into a cylindrical member for forming an outermost layer. Then, a fluid is injected into the cavity at a given injection pressure to increase the thickness of the intermediate layer so as to bond the intermediate layer to the inner surface of the cylindrical member. In the insertion of the core member into the cylindrical member in this process, if the thickness of the intermediate layer is decreased by reducing the pressure in the cavity (passageway), the core member can be more smoothly inserted into the cylindrical member.

Figure 3:
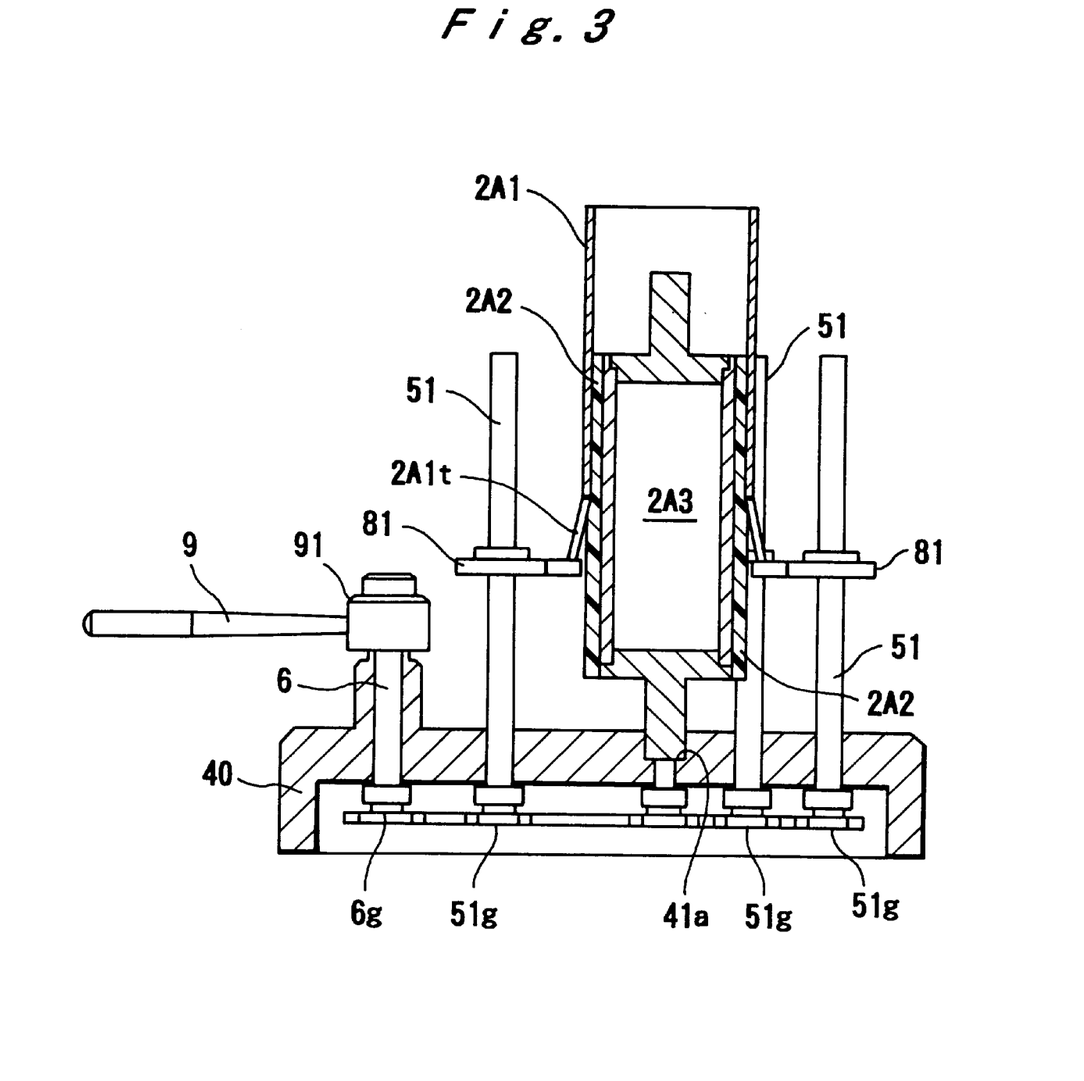
FIG. 3 is a longitudinal sectional view of one preferred embodiment of an apparatus for manufacturing a pressure roll.
Figure 4A:
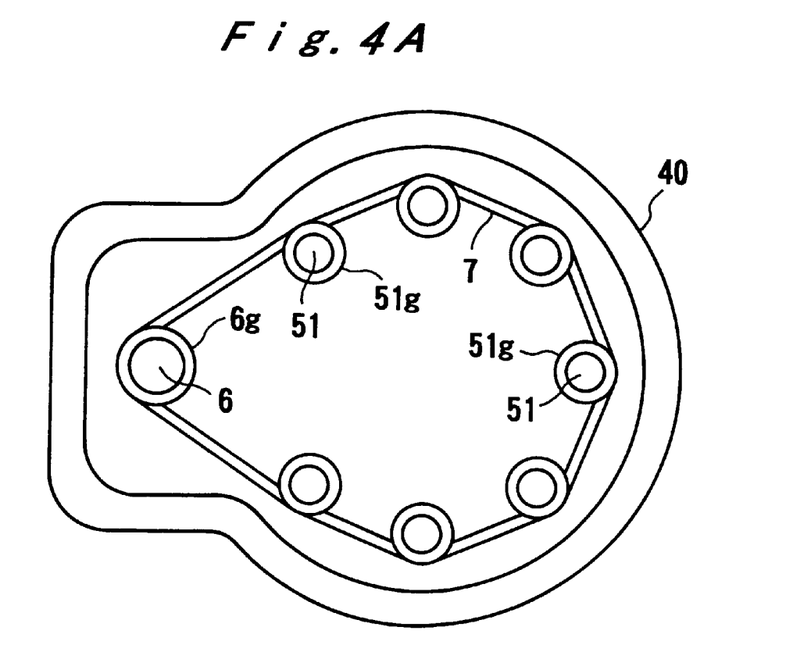
FIG. 4A is a bottom plan view of the apparatus shown in FIG. 3.
Figure 4B:
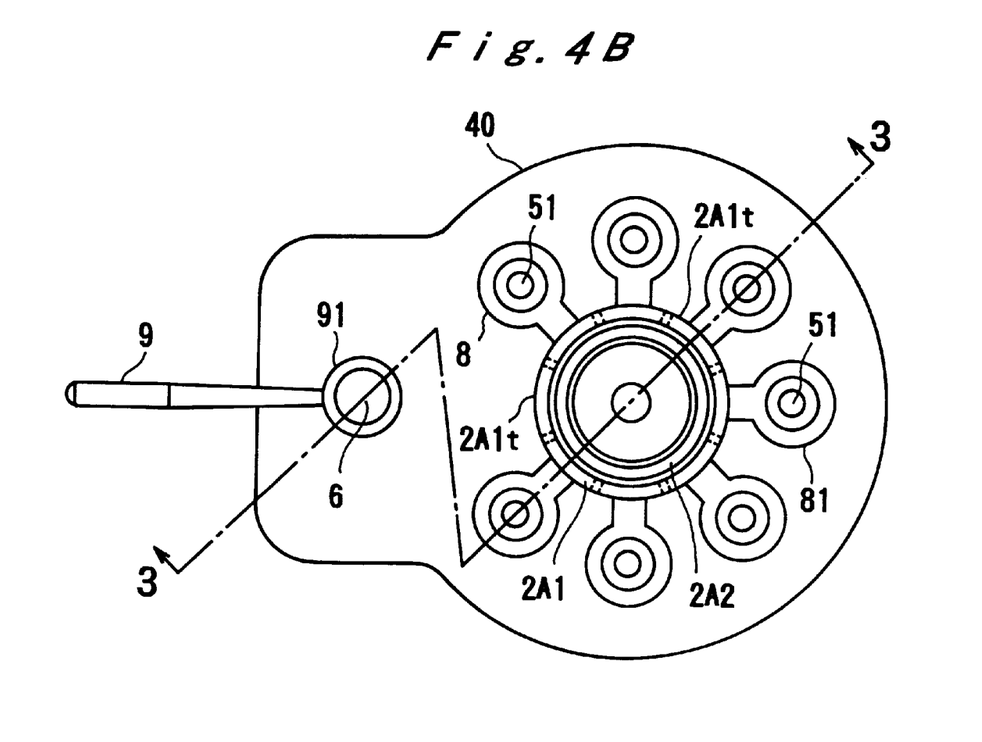
FIG. 4B is a plan view thereof.

Of the processes for manufacturing the pressure roll of the invention, the process (1) is described below in more detail with reference to FIG. 3, FIG. 4A and FIG. 4B. FIG. 3 is a longitudinal sectional view of one preferred embodiment of a fitting apparatus preferably used for carrying out the process (1). FIG. 4A is a bottom plan view of the apparatus shown in FIG. 3, and FIG. 4B is a plan view thereof. FIG. 3 is a sectional view taken on line 3—3 in FIG. 4B. In this fitting apparatus, as shown in FIG. 3, shafts 51 and 6 are inserted into plural shaft holes provided on a rest or support 40 which is firm and almost flat, to make the shafts rotatably disposed on the rest 40. Each of the shafts 51 is a screw shaft provided with a screw over almost the whole length on its outer circumference (sometimes referred to as "screw shaft 51" hereinafter). The shaft 6 is a ratchet shaft.

On the rest 40, a depression 41a receiving the shaft end of the core member 2A3 surrounded with the intermediate layer 2A2 is formed, and a total of seven screw shafts 51 are arranged at almost the same intervals about the circumference of the depression 41a. That is, at the center of the plural screw shafts 51 arranged on the circumference, a semi-finished product composed of the core member 2A3 and the intermediate layer 2A2 surrounding the core member, and a cylindrical member (outermost layer 2A1) into which the semi-finished product is to be inserted are supported.

The cylindrical member 2A1 for forming the outermost layer is provided with even-numbered notches of a given length which extend from one end of the member toward the other end and are almost in parallel with the axis. The tongues formed among the notches are slightly bent outward.

The cylindrical member 2A1, the screw shafts 51 and the semi-finished product are arranged in the manner described above, and therefore the semi-finished product can be uniformly fit into the outermost layer 2A1. That is, if the outer diameter of the pressure roll 2A is for example 200 to 400 mm, the inner diameter of the cylindrical member is made smaller by 0.3 to 0.9 mm than the outer diameter of the flexible material intermediate layer 2A2 which is to be positioned inside the cylindrical member. After the intermediate layer 2A2 is fit into the cylindrical member 2A1, the cylindrical member (outermost layer) constricts the intermediate layer that much.

For inserting the core member 2A3 surrounded with the flexible material intermediate layer into the cylindrical member 2A1, accordingly, a large traction or thrust force must be applied in the major axis direction of the cylindrical member 2A1 so as to compete with a high resistance. Moreover, the traction force or the thrust force is required to be applied as uniformly as possible on the circumference of the cylindrical member 2A1.

In the screw shafts 51 of this embodiment, the screws provided on their circumferences are male screws whose directions are the same as each other, and the screws are engaged with corresponding female screws provided on flanges 81.

The flange 81 is in the form of a circle with an overhang, as shown in FIG. 4A and FIG. 4B. The overhang serves to transmit the traction force to the cylindrical member 2A1 to be fit. The screw shafts 51 are rotated to pull the flanges 81 to the lower side of FIG. 3, whereby the traction force is produced. The transmission of the traction force is achieved by way of the tongues 2A1t of the cylindrical member 2A1, because the overhangs of the flanges 81 are firmly joined to the tongues 2A1t.

The overhangs of the flanges 81 can be firmly joined to the tongues 2A1t by, for example, adhesion with adhesives of ultra-high adhesion strength or welding. Of these, welding is preferred. The adhesives of ultra-high adhesion strength desirably has, for example, adhesion strength of such degree that external plates can be adhered to each other in the manufacture of large-sized airplanes.

As shown in FIG. 4A and FIG. 4B, the rest 40 is designed to have a shape of a combination of an almost circular main body and an almost rectangular overhang projected from the main body.

On the main body of the rest 40, seven screw shafts 51, which pass through the shaft holes provided along the circumference of the main body, are rotatably held. At the lower ends of the screw shafts 51 protruded from the bottom of the rest 40, sprockets (sprocket wheels) 51g are provided.

On the overhang of the rest 40, a ratchet shaft 6 is rotatably held. Also a sprocket 6g is provided at the lower end of the ratchet shaft 6.

In the fitting apparatus of this embodiment, a driving chain 7 is wound around all of the sprockets 51g and 6g so that the driving chain 7 is engaged with the sprockets 51g and 6g from the outside. Accordingly, with the rotation of the ratchet shaft 6, all of the sprockets 51g coincidentally rotate, whereby all of the flanges 81 descend simultaneously. In this system, the screws provided on all of the screw shafts are designed to run in the same direction (i.e., right-handed screws only or left-handed screws only are provided).

The driving chain 7 is not necessarily set in the same manner as in this embodiment. For example, the driving chain 7 can be set in such a manner that the chain 7 meanders through the sprockets 51g provided on the screw shafts 51 (this system sometimes referred to as "alternate setting system").

In this alternate setting system, the portion of the driving chain 7 engaged with each sprocket 51g is lengthened, and as a result the driving power can be efficiently transmitted.

In the alternate setting system, the screws provided on the shafts 51 having the sprockets 51g with which the driving chain 7 is engaged outside are required to be made reversed to the screws provided on the shafts 51 having the sprockets 51g with which the driving chain 7 is engaged inside. Therefore, the alternate setting system is economically disadvantageous in that the left-handed screws which are more expensive than the right-handed screws must be used.

As shown particularly in FIG. 3 and FIG. 4B, the ratchet shaft 6 is held on the overhang of the rest 4, and the ratchet shaft 6 is provided with a ratchet mechanism 91 and a driving lever 9 one end of which is fixed to the ratchet mechanism 91. A rotational force in the specific direction is applied to the driving lever 9, and this force is transmitted to the ratchet shaft 6 by means of the ratchet mechanism 91, whereby the ratchet shaft 6 is rotated in the specific one direction through a given angle.

On the circular main body, seven screw shafts 51 are arranged on the same circumference. To the screw shafts 51, the rotating power in one direction is transmitted from the ratchet shaft 6 by way of the driving chain 7, whereby all of the screw shafts 51 are rotated in the same direction.

The screw shafts 51 are screwed to the flanges 8, respectively. The overhang of each flange extends toward the center of the cylindrical member 2A1 and is fixed to the respective tongue 2A1t formed at the bottom of the cylindrical member 2A1. The tongues 2A1t are, as shown in FIG. 4B, eight strips of narrow and arcuate form, and they are adjacent to each other at narrow intervals. The outer surfaces of the tongues 2A1t are arranged on the same circumference.

This circumference corresponds to the outer periphery of the cylindrical member 2A1 to be fit. Inside the cylindrical member 2A1, the intermediate layer 2A2 made of a flexible material is placed. The intermediate layer 2A2 is generally made of a rubber. Inside the intermediate layer 2A2, the core member 2A3 made of steel or the like is arranged, and the core member is provided with a rotating shaft of the pressure roll 2A.

Operation of the fitting apparatus of the above structure will be described below. Referring to FIG. 3, when the driving lever 9 is moved back and forth alternately at a given angle, only a rotating movement in the specific direction is intermittently transmitted to the ratchet shaft 6 by way of the ratchet mechanism 91.

The intermittent rotation in the specific direction transmitted to the ratchet shaft 6 is then transmitted to the sprockets 6g provided on the other end of this shaft 6, and the rotation of the sprocket 6g is transmitted to the screw shafts 51 by way of the driving chain 7 engaged with the sprocket 6g, so as to rotate the screw shafts 51.

All of the screw shafts 51g thus rotated pull down the flanges 81 joined to the shafts 51 with the screws provided on the circumferences of the shafts 51. The external force to pull down the flanges 81 pulls down the cylindrical member 2A1 by way of the overhangs of the flanges 81. As a result, the cylindrical member 2A1 goes downward constricting the intermediate layer 2A2 made of a flexible material. When the tips of the tongues 2A1t formed at the bottom of the metallic outer cylinder 2A1 are pulled down to the position slightly below the lower end of the intermediate layer 2A2, the fitting operation is completed.

After the fitting operation, the resulting roughly manufactured article of the pressure roll 2A is taken out of the apparatus. Then, all the tongues 2A1t protruded from one end of the article are cut off and the cut areas are subjected to finishing. Thus, the pressure roll 2A is obtained.

EFFECT OF THE INVENTION

According to the pressure roll of the invention and the molding apparatus equipped with the pressure roll, an extremely thin extruded sheet having much smaller thickness (thickness: about 0.09 mm) than the conventional thin extruded sheets(thickness: about 0.4 mm) which was thought to be the thinnest sheet can be obtained, though a system of pressurizing a cast sheet is used.

According to the invention, further, a metallic belt which can be hardly bent and a large-sized roll are unnecessary, and hence a molding apparatus, that is small-sized, inexpensive and capable of producing extremely thin extruded sheets, can be provided.

According to the invention, furthermore, the conventional apparatus can be easily improved by replacing its pressure roll with the pressure roll of the invention, and hence the cost for the improvement is relatively low.

Moreover, since no metallic belt is used in the invention, various problems associated with the use of the metallic belt, e.g., care about an accident of breaking of the metallic belt, discontinuance of the operation caused by breaking of the metallic belt, and preparation of spare metallic belts, can be solved. In addition, the large expense associated with the purchase of the metallic belt is unnecessary.

EXAMPLE

The present invention will be further described with reference to the attached drawings and the following., examples, but it should be construed that the invention is in no way limited to those drawings and examples.

EXAMPLE 1

A molten extruded sheet (S) (thickness: about 0.4 mm, width: 1,150 mm) of a propylene-ethylene crystalline copolymer [MFR (230° C., 2.16 kgf): 2.6 g/10 min, crystalline melting point: 159° C., ethylene unit content: 2.5% by mol] was extruded from a T-die (1) connected to a discharge opening of a screw extruder, and fed between a pressure roll (2A) and a main cooling roll (2B) of the molding apparatus shown in FIG. 1A. In the operation, the linear pressure applied to the extruded sheet (S) by the pressure roll (2A) was 9.0 kgf/cm. The extruded sheet (S) was pressed by the pressure roll (2A) onto the surface of the main cooling roll (2B) and simultaneously cooled rapidly through the surface contact with a metallic external cylinder (2A1) of the pressure roll, to obtain an extremely thin sheet (thickness: 0.09 mm).

During the above-mentioned thin film-forming operation, any bank of the molten resin did not take place on the inlet side between the pressure roll (2A) and the main cooling roll (2B). The metallic external cylinder (2A1) was elastically deformed at its pressed area so as to be rendered a little flat, and as a result the cylinder was brought into surface contact with the extruded sheet (S). The length of the surface contact of the metallic external cylinder with the extruded sheet by the deformation of the cylinder toward its center (deformation quantity of pressed area) was 1.6 mm on average.

The main cooling roll (2B) (diameter: 500 mm) of the above-mentioned molding apparatus is wholly made of cast iron and includes therein a passageway of cooling water, as shown in FIG. 1B. The cooling water (temperature: 12° C.) was introduced into the passageway is introduced from or discharged to the outside by way of a passageway disposed in the rotating shaft.

In the pressure roll (2A) (diameter: 300 mm), the core member (2A3) is formed from cast iron, the flexible intermediate layer (2A2) is formed from a rubber (durometer hardness: 68 degrees), and the metallic external cylinder (2A1) (thickness: 1.2 mm) is formed from corrosion-resistant steel (SUS 304).

The pressure roll (2A) was cooled by immersing it in a cooling water (temperature: 25° C.) stored in a reservoir (41) of a cooling means (4), and the temperature of the outermost layer (2A1) was kept at 30° C. during the operation. The operation of the molding apparatus was carried out while removal of the cooling water from the surface of the pressure roll (2A) and drying of the surface were performed by the use of a removal means (5) having a combination of a rubber scraper blade (5a) and a cold air spraying device (5c) (temperature of cold air: 15° C.).

The extremely thin extruded sheet obtained was measured on various properties. The results are set forth in Table 1.

EXAMPLE 2

The same molten extruded sheet (S) of a propylene-ethylene crystalline copolymer as used in Example 1 except for the thickness (thickness: about 0.35 mm, width: 1,150 mm) was fed between the pressure roll (2A) and the main cooling roll (2B) of the molding apparatus, to prepare an extremely thin sheet.

In the operation, the temperature of the pressure roll (2A) was 28° C., and the linear pressure applied to the extruded sheet (S) by the pressure roll (2A) was 12.0 kgf/cm. The extruded sheet (S) was pressed by the pressure roll (2A) onto the surface of the main cooling roll (2B) and simultaneously cooled rapidly through the surface contact with the metallic external cylinder (2A1), to obtain an extremely thin extruded sheet (S) (thickness: 0.10 mm) of good appearance and high quality.

During the above-mentioned thin film-forming operation, any bank of the molten resin did not take place on the inlet side between the pressure roll (2A) and the main cooling roll (2B). The outermost layer (2A1) was elastically deformed at its pressed area so as to be rendered a little flat (deformation quantity of pressed area: 1.2 mm on average), whereby the outermost layer was brought into surface contact with the extruded sheet (S).

The main cooling roll (2B) and the operation conditions thereof used in this example were the same as in Example 1.

The pressure roll (2A) used in this example was the same as in Example 1 except that the thickness of the corrosion-resistant steel (SUS 304) cylinder used as the outermost layer (2A1) was increased to 1.5 mm.

The extremely thin extruded sheet obtained was measured on various properties. The results are set forth in Table 1.

EXAMPLE 3

The same molten extruded sheet (S) of a propylene-ethylene crystalline copolymer as used in Example 1 except for the thickness (thickness: about 0.35 mm, width: 1,150 mm) was fed between the pressure roll (2A) and the main cooling roll (2B) of the molding apparatus, to prepare an extremely thin sheet.

In the operation, the temperature of the pressure roll (2A) was made 35° C. by cooling it with cooling water, and the linear pressure applied to the extruded sheet (S) by the pressure roll (2A) was 14.0 kgf/cm. The extruded sheet (S) was pressed by the pressure roll (2A) onto the surface of the main cooling roll (2B) and simultaneously cooled rapidly through the surface contact with the metallic external cylinder (2A1), to obtain an extremely thin extruded sheet (S) (thickness: 0.12 mm) of good appearance and high quality.

During the above-mentioned thin film-forming operation, any bank of the molten resin did not take place on the inlet side between the pressure roll (2A) and the main cooling roll (2B). The metallic external cylinder (2A1) was elastically deformed at its pressed area so as to be rendered a little flat (deformation quantity of pressed area: 1.5 mm on average), whereby the cylinder was brought into surface contact with the extruded sheet (S).

The main cooling roll (2B) and the operation conditions thereof used in this example were the same as in Example 1.

The pressure roll (2A) used in this example was the same as in Example 1 except that the diameter was decreased to 250 mm and that the thickness of the corrosion-resistant steel (SUS 304) cylinder used as the outermost layer (2A1) was decreased to 1.0 mm.

The extremely thin extruded sheet obtained was measured on various properties. The results are set forth in Table 1.

EXAMPLE 4

A molten extruded sheet (S) (thickness: about 0.4 mm, width: 1,150 mm) of high-density polyethylene [density: 0.967 g/cc, MI (190° C., 2.16 kgf) : 5.5 g/10 min] was extruded from a T-die (1) connected to a discharge opening of a screw extruder, and fed between a pressure roll (2A) and a main cooling roll (2B) of the molding apparatus shown in FIG. 1A. In the operation, the linear pressure applied to the extruded sheet (S) by the pressure roll (2A) was 5.0 kgf/cm. The extruded sheet (S) was pressed by the pressure roll (2A) onto the surface of the main cooling roll (2B) and simultaneously cooled rapidly through the surface contact with a metallic external cylinder (2A1) of the pressure roll, to obtain an extremely thin extruded sheet (thickness: 0.13 mm) of good appearance and high quality.

During the above-mentioned thin film-forming operation, any bank of the molten resin did not take place on the inlet side between the pressure roll (2A) and the main cooling roll (2B). The outermost layer (2A1) was elastically deformed at its pressed area so as to be rendered a little flat (deformation quantity of pressed area: 0.9 mm on average), whereby the outermost layer was brought into surface contact with the extruded sheet (S).

The main cooling roll (2B) (diameter: 500 mm) of the above-mentioned molding apparatus is wholly made of cast iron and includes therein a passageway of cooling water (not shown). The cooling water (temperature: 12° C.) introduced into the passageway introduced from or discharged to the outside by way of a passageway disposed in the rotating shaft.

In the pressure roll (2A) (diameter: 300 mm), the core member (2A3) is formed from cast iron, the flexible intermediate layer (2A2) is formed from a rubber (durometer hardness: 69 degrees), and the metallic external cylinder (2A1) (thickness: 1.2 mm) is formed from corrosion-resistant steel (SUS 304).

The pressure roll (2A) was cooled by immersing it in a cooling water (temperature: 38° C.) stored in a reservoir (41) of a cooling means (4), and the temperature of the outermost layer (2A1) was kept at 39° C. during the operation. The operation of the molding apparatus was carried out while removal of the cooling water from the surface of the pressure roll (2A) and drying of the surface were performed by the use of a removal means (5) including a combination of a rubber scraper blade (5a) and a cold air spraying device (5c) (temperature of cold air: 15° C.).

The extremely thin extruded sheet obtained was measured on various properties. The results are set forth in Table 1.

EXAMPLE 5

A molten extruded sheet (S) (thickness: about 0.4 mm, width: 1,150 mm) of a propylene crystalline copolymer [MFR (230° C., 2.16 kgf): 2.6 g/10 min, crystalline melting point: 159° C., ethylene unit content: 2.5% by mol] was extruded from a T-die (1) connected to a discharge opening of a screw extruder, and fed between a pressure roll (2A) and a main cooling roll (2B) of the molding apparatus shown in FIG. 1A. In the operation, the linear pressure applied to the extruded sheet (S) by the pressure roll (2A) was 2.0 kgf/cm. The extruded sheet (S) was pressed by the pressure roll (2A) onto the surface of the main cooling roll (2B) and simultaneously cooled rapidly through the surface contact with a metallic external cylinder (2A1) of the pressure roll, to obtain an extremely thin sheet (thickness: 0.09 mm).

The main cooling roll (2B) and the operation conditions thereof used in this example were the same as in Example 1.

The pressure roll (2A) used in this example was the same as in Example 1 except that the outer diameter was decreased to 200 mm and that an aluminum cylindrical member (thickness: 2.0 mm) was used as the outermost layer (2A1).

The molding apparatus was operated in the same manner as in Example 1 except that the temperature of the cooling water for cooling the outermost layer (2A1) of the pressure roll (2A) was set to 25° C. and that the temperature of the outermost layer (2A1) during the operation was set to 3720 C.

During the above-mentioned thin film-forming operation, any bank of the molten resin did not take place on the inlet side between the pressure roll (2A) and the main cooling roll (2B). The metallic external cylinder (2A1) was elastically deformed at its pressed area so as to be rendered a little flat (deformation quantity of pressed area: 2.2 mm on average), whereby the cylinder was brought into surface contact with the extruded sheet (S).

The extremely thin extruded sheet obtained was measured on various properties. The results are set forth in Table 1.

EXAMPLE 6

A molten extruded sheet (S) (thickness: about 0.4 mm, width: 1,150 mm) of a 4-methyl-1-pentene crystalline polymer was extruded from a T-die (1) connected to a discharge opening of a screw extruder, and fed between a pressure roll (2A) and a main cooling roll (2B) of the molding apparatus shown in FIG. 1A. In the operation, the linear pressure applied to the extruded sheet (S) by the pressure roll (2A) was 3.0 kgf/cm. The extruded sheet (S) was pressed by the pressure roll (2A) onto the surface of the main cooling roll (2B) and simultaneously cooled rapidly through the surface contact with a metallic external cylinder (2A1) of the pressure roll, to obtain an extremely thin sheet (thickness: 0.13 mm).

The main cooling roll (2B) and the operation conditions thereof used in this example were the same as in Example 1.

The pressure roll (2A) used in this example was the same as in Example 1 except that the outer diameter was decreased to 200 mm and that a phosphor bronze cylindrical member (thickness: 1.8 mm, in accordance with JIS H3731) was used as the outermost layer (2A1).

The molding apparatus was operated in the same manner as in Example 1 except that the temperature of the cooling water for cooling the outermost layer (2A1) of the pressure roll (2A) was set to 30° C. and that the temperature of the outermost layer (2A1) during the operation was set to 45° C.

During the above-mentioned thin film-forming operation, any bank of the molten resin did not take place on the inlet side between the pressure roll (2A) and the main cooling roll (2B). The metallic external cylinder (2A1) was elastically deformed at its pressed area so as to be rendered a little flat (deformation quantity of pressed area: 2.5 mm on average), whereby the cylinder was brought into surface contact with the extruded sheet (S).

The extremely thin extruded sheet obtained was measured on various properties. The results are set forth in Table 1.

COMPARATIVE EXAMPLE 1

A molten extruded sheet (S) (thickness: 0.35 mm) of the same propylene crystalline copolymer as in Example 5 was fed to the molding apparatus shown in FIG. 2A, to obtain an extremely thin sheet. In this molding apparatus, the molten extruded sheet (S) was fed between a corrosion-resistant steel belt (31) (thickness: 1.0 mm, temperature during operation: 45° C.) and a main cooling roll (21B), said corrosion-resistant steel belt (31) being set between a press roll (21A) of a large diameter (diameter: 1,000 mm, temperature during operation: 45° C.) and a support roll (22). In the operation, the corrosion-resistant steel belt (31) was brought into contact with the extruded sheet (S) under a linear pressure of 15.0 kgf/cm. As a result, there was obtained an extruded sheet (S) (thickness: 0.2 mm) slightly showing residual strain at the place where the joint of the corrosion-resistant steel belt (31) was contacted.

During the above-mentioned thin film-forming operation, any bank of the molten resin did not take place on the inlet side between corrosion-resistant steel belt (31) and the main cooling roll (21B). However, it cannot be said that the extruded sheet (S) had good properties, because residual stain was found at the place where the joint of the belt (31) was contacted.

The extruded sheet (S) obtained was measured on various properties. The results are set forth in Table 1.

COMPARATIVE EXAMPLE 2

Using an extruded sheet (S) (thickness: 0.30 mm) obtained by extruding the same propylene crystalline copolymer as in Example 5 from a T-die (1), an extremely thin sheet was prepared by means of the same molding apparatus under the same conditions as in Example 5 except that a mirror surface roll (temperature: 70° C.) made of chrome-plated ordinary steel was used as the pressure roll (2A) and that the mirror surface roll was brought into contact with the extruded sheet (S) under a linear pressure of 20.0 kgf/cm. In the extruded sheet (thickness: 0.30 mm) obtained, residual strain was observed all over the surface, and moreover bad (ununiform) molecular orientation was also observed.

During the above-mentioned thin film-forming operation, a bank of the molten resin took place on the inlet side between the mirror surface roll and the main cooling roll (2B). Further, from the fact that the deformation quantity of the pressed area was 0 mm, it was clear that the contact of the mirror surface roll with the extruded sheet (S) was a linear contact.

The extruded sheet (S) obtained was measured on various properties. The results are set forth in Table 1.

COMPARATIVE EXAMPLE 3

Using an extruded sheet (S) (thickness: 0.35 mm) obtained by extruding the same propylene crystalline copolymer as in Example 5 from a T-die (1), an extremely thin sheet was prepared by means of the same molding apparatus under the same conditions as in Example 5 except that a mirror surface roll (temperature: 70° C.) made of chrome-plated ordinary steel was used as the pressure roll (2A) and that the mirror surface roll was brought into contact with the extruded sheet (S) under a linear pressure of 25.0 kgf/cm. In the extruded sheet (thickness: 0.35 mm) obtained, residual strain was observed all over the surface, and moreover bad (ununiform) molecular orientation was also observed.

During the above-mentioned thin film-forming operation, a bank of the molten resin took place on the inlet side between the mirror surface roll and the main cooling roll (2B). Further, from the fact that the deformation quantity of the pressed area was 0 mm, it was clear that the contact of the mirror surface roll with the extruded sheet (S) was a linear contact.

The extruded sheet (S) obtained was measured on various properties. The results are set forth in Table 1.

TABLE 1

Structure of Pressure Roll and Operation Conditions

| Experiment contents | Outer metallic cylinder | | | | | | |
|---|---|---|---|---|---|---|---|
| | Outer diameter mm | Temperature of cooling water °C. | Temperature in operation °C. | Thickness mm | Kind | Pressure kgf/cm (liner pressure) | Deformation quality of pressed area mm |
| Ex. 1 | 300 | 25 | 30 | 1.2 | Corrosion resistant steel | 9.0 | 1.6 |
| Ex. 2 | 300 | 25 | 28 | 1.5 | Corrosion resistant steel | 12.0 | 1.2 |
| Ex. 3 | 250 | 30 | 35 | 1.0 | Corrosion resistant steel | 14.0 | 1.5 |
| Ex. 4 | 300 | 38 | 39 | 1.2 | Corrosion resistant steel | 5.0 | 0.9 |
| Ex. 5 | 200 | 25 | 37 | 2.0 | Al alloy | 2.0 | 2.2 |
| Ex. 6 | 300 | 30 | 45 | 1.8 | Copper alloy | 3.0 | 2.5 |

Formation of extremely thin extruded sheet

| Experiment contents | Bank of molten resin observed or none | Extremely thin sheet | | |
|---|---|---|---|---|
| | Material resin | | Thickness mm | External haze (%) | Appearance and quality |
| Ex. 1 | PP | None | 0.09 | 24 | Both good |
| Ex. 2 | PP | None | 0.10 | 7 | Both good |
| Ex. 3 | PP | None | 0.12 | 2 | Both good |
| Ex. 4 | PE | None | 0.13 | 24 | Both good |
| Ex. 5 | PP | None | 0.09 | 7 | Both good |
| Ex. 6 | PMPT | None | 0.12 | 2 | Both good |

Use of corrosion-resistant steel belt
Structure of Pressure Roll and Operation Conditions

| Experiment contents | Outer metallic cylinder | | | | | | |
|---|---|---|---|---|---|---|---|
| | Outer diameter mm | Temperature of cooling water °C. | Temperature in operation °C. | Thickness mm | Kind | Pressure kgf/cm (linear pressure) | Deformation quality of pressed area mm |
| Comp Ex. 1 | 1000 | 45 | 45 | 1.0 | Corrosion resistant steel | 15.0 | Not measured |

Use of corrosion-resistant steel belt
Formation of extremely thin extruded sheet

| Experiment contents | Bank of molten resin observed or none | Extremely thin sheet | | |
|---|---|---|---|---|
| | Material resin | | Thickness Thickness mm | External haze (%) | Appearance and quality and quality |
| Comp Ex. 1 | PP | None | 0.2 | 18 | Slight residual strain observed at the joint-belt contacting point |

TABLE 1-continued

Use of conventional metallic mirror surface roll
Structure of Pressure Roll and Operation Conditions

| Experiment contents | Outer diameter mm | Outer metallic cylinder | | | | | |
|---|---|---|---|---|---|---|---|
| | | Temperature of cooling water °C. | Temperature in operation °C. | Thickness mm | Kind | Pressure kgf/cm (liner pressure) | Deformation quality of pressed area mm |
| Comp Ex. 2 | 300 | 56 | 70 | none* | Ordinary steel | 20.0 | 0 |
| Comp Ex. 3 | 300 | 25 | 41 | none* | Ordinary steel | 25.0 | 0 |

| Experiment | Use of conventional metallic mirror surface roll Formation of extremely thin extruded sheet | | | | |
|---|---|---|---|---|---|
| | | Bank of molten resin | Extremely thin sheet | | |
| | | | Thickness | External | Appearance |
| Comp Ex. 2 | PP | Observed | 0.30 | 28 | Residual strain all over the surface/Poor molecular orientation |
| Comp Ex. 3 | PE | Observed | 0.35 | 40 | Residual strain all over the surface/Poor molecular orientation |

Corrosion-resistant steel: SUS304;
Copper alloy: phosphor bronze of JIS H 3731;
Deformation quality of pressed area: deformed length of the metallic outer cylinder toward the center
PP: crystalline polypropylene;
PE: high-density polyethylene;
PMPT: poly-4-methyl-1-pentene
*chrome-plated

What is claimed is:

1. A process of manufacturing a pressure roll, the process comprising:
    forming a plurality of axially extending notches in a cylindrical member, wherein said notches extend from one end of said cylindrical member and are spaced about the circumference of said cylindrical member at predetermined intervals to thereby form a plurality of tongues;
    bending the tongues formed by said notches in a radial direction of said cylindrical member so as to enlarge an inner diameter of the one end of said cylindrical member; and
    inserting a core member into the enlarged end of said cylindrical member, said core member being surrounded by an intermediate layer formed of a flexible material, wherein said intermediate layer has an outer diameter that is larger than the inner diameter of said cylindrical member.

2. A process of manufacturing a pressure roll as claimed in claim 1, wherein the step of inserting said core member includes engaging a plurality of the tongues and pulling said cylindrical member over said core member.

3. A process of manufacturing a pressure roll as claimed in claim 2, wherein said cylindrical member is pulled over said core member until the enlarged end of said cylindrical member is positioned below a lower end of said intermediate layer.

4. A process of manufacturing a pressure roll as claimed in claim 3, further comprising:
    cutting the tongues so as to remove any portion of said cylindrical member which projects beyond the lower end of said intermediate layer; and
    finishing cut areas of said cylindrical member.

5. A process of manufacturing a pressure roll, the process comprising:
    placing a flexible intermediate layer on a core member, wherein a first end of said core member is attached to a first rotary shaft member and a second end of said core member is attached to a second rotary shaft member;
    supporting the first rotary shaft member on a support structure;
    forming a plurality of axially extending notches in a cylindrical member such that said notches extend from one end of said cylindrical member and are spaced about the circumference of said cylindrical member at predetermined intervals to thereby form a plurality of tongues;
    bending the tongues in a radial direction of said cylindrical member so as to enlarge an inner diameter of the one end of said cylindrical member;
    attaching terminal ends of a plurality of the tongues to a plurality of force applying mechanisms, respectively; and inserting the second rotary shaft member of said core member into the enlarged end of said cylindrical member, wherein said intermediate layer has an outer diameter that is larger than an inner diameter of said cylindrical member.

6. A process of manufacturing a pressure roll as claimed in claim 5, further comprising applying downward forces to the tongues attached to said force applying mechanisms so as to pull said cylindrical member over said core member.

7. A process of manufacturing a pressure roll as claimed in claim 6, wherein said force applying step is continued until the enlarged end of said cylindrical member is located beyond the first end of said core member.

8. A process of manufacturing a pressure roll as claimed in claim 7, further comprising:

removing said cylindrical member from said support structure;

cutting the tongues so as to remove any portion of said cylindrical member projecting beyond the first end of said core member; and finishing the cut areas of said cylindrical member.

9. A process of manufacturing a pressure roll as claimed in claim 5, wherein the step of attaching the plurality of the tongues to the force applying mechanisms includes welding a portion of each of the force applying mechanisms to the respective tongue.

10. A process of manufacturing a pressure roll as claimed in claim 5, wherein the step of attaching the plurality of the tongues to the force applying mechanisms includes adhesively bonding a portion of each of the force applying mechanisms to the respective tongue.

* * * * *